March 18, 1952    H. G. NEWMAN ET AL    2,589,425

LAWN SEED DRILL

Filed March 17, 1950      2 SHEETS—SHEET 1

INVENTOR.
HYMIE G. NEWMAN
BY DAVE B. NEWMAN

McMorrow, Berman & Davidson
ATTORNEYS

March 18, 1952     H. G. NEWMAN ET AL     2,589,425
LAWN SEED DRILL
Filed March 17, 1950     2 SHEETS—SHEET 2
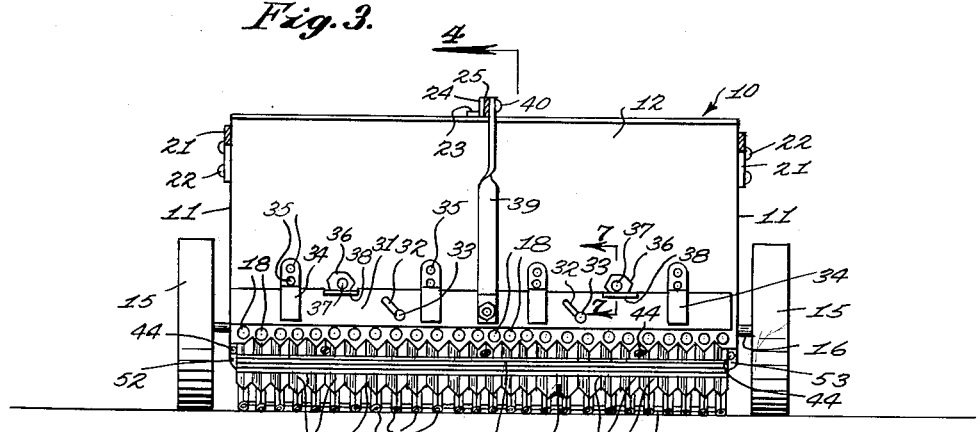
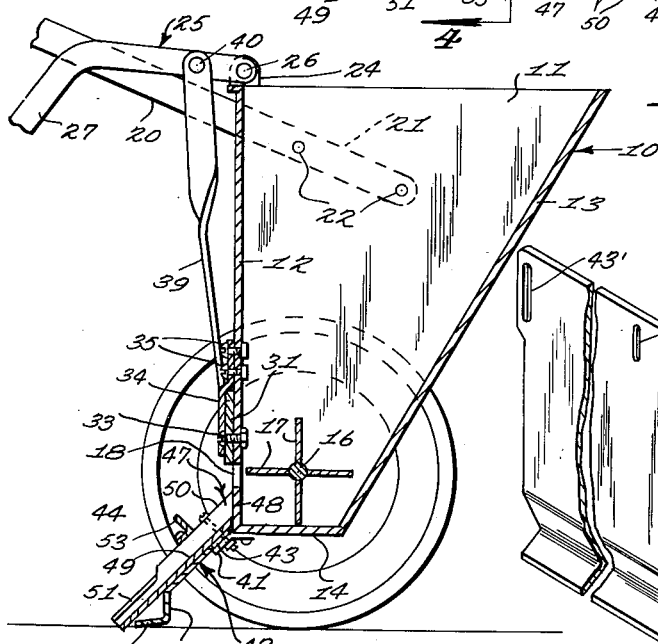
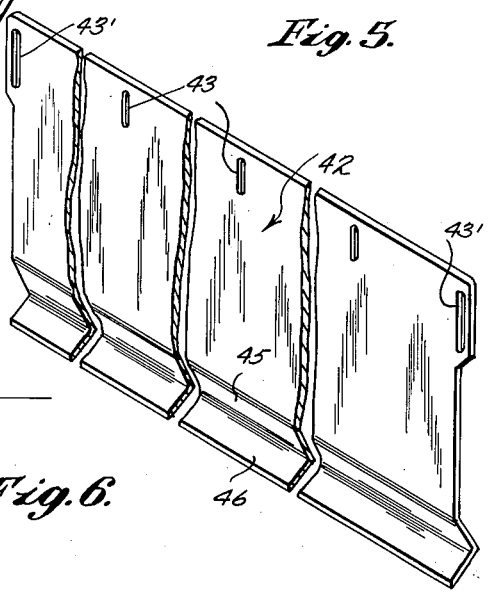
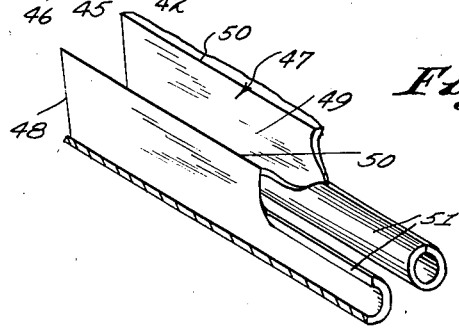
INVENTOR.
Hymie G. Newman
BY Dave B. Newman
McMorrow, Berman & Davidson
ATTORNEYS Patented Mar. 18, 1952

2,589,425

UNITED STATES PATENT OFFICE 2,589,425

LAWN SEED DRILL

Hymie G. Newman and Dave B. Newman, Edmonton, Alberta, Canada

Application March 17, 1950, Serial No. 150,164

2 Claims. (Cl. 111—82)

Our invention relates to a lawn seed drill.

A primary object of the invention is to provide a highly simplified and effective lawn seeding machine or drill, which is hand-operated, so as to be particularly useful for making new lawns and replenishing old ones, by home owners and the like.

A further object of the invention is to provide a seeding attachment which may be readily mounted upon substantially any rotary type fertilizer spreader.

A further object is to provide a lawn seed drill, the use of which will result in the germination of a higher percentage of the planted seed, and which will materially reduce the time and labor generally required for planting a lawn.

A further object is to provide a device of the above-mentioned character which eliminates the need for raking the seed into the soil, after it is cast upon the soil.

A further object of the invention is to provide a lawn seed drill which is equally useful for spreading fertilizer upon the lawn.

A still further object is to provide a device of the above-mentioned character which is highly compact, simplified, extremely strong and durable and relatively inexpensive to build.

Other objects and advantages of the invention will be apparent during the course of the following description.

Figure 1:
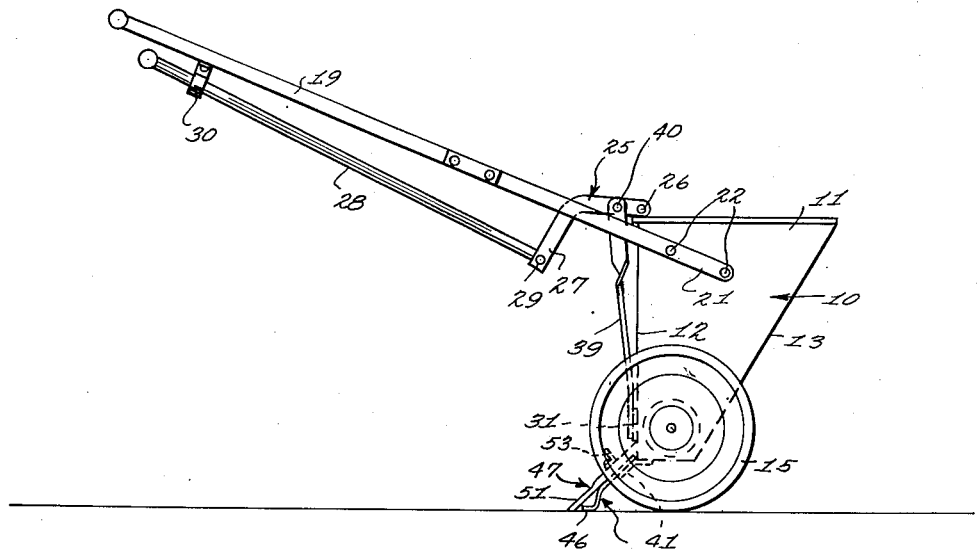
Figure 2:
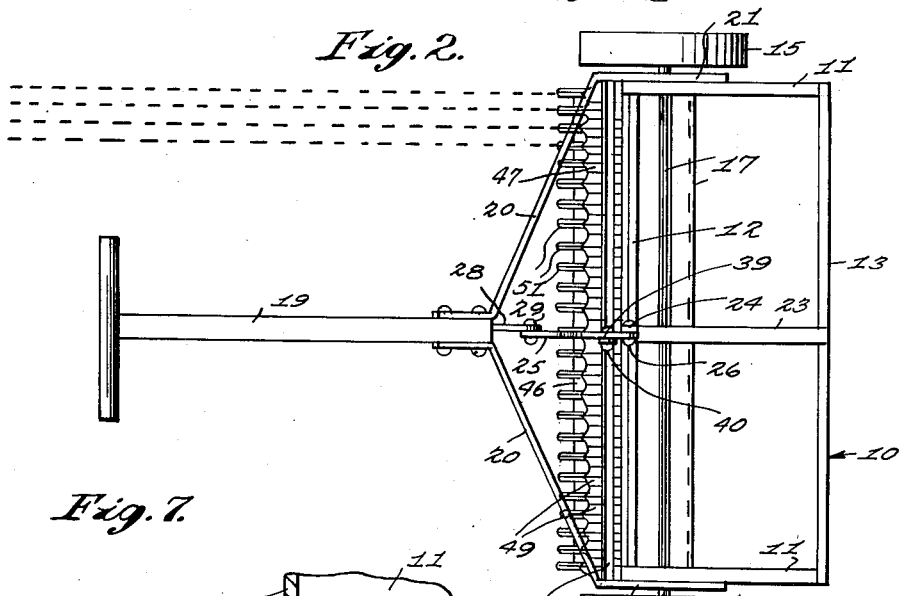
Figure 7:
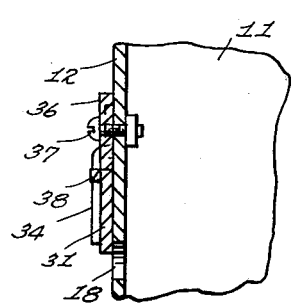

In the accompanying drawings, forming a part of this application, and in which like numerals are employed to designate like parts throughout the same, Figure 1 is a side elevation of a lawn seed drill embodying our invention, Figure 2 is a plan view of the same, Figure 3 is a rear end elevational view of the drill, parts in section, Figure 4 is a transverse vertical sectional view taken on line 4—4 of Figure 3, Figure 5 is an enlarged fragmentary perspective view of a gage plate removed, Figure 6 is an enlarged fragmentary perspective view of a drill plate removed, and, Figure 7 is an enlarged fragmentary vertical sectional view taken on line 7—7 of Figure 3.

In the drawings, where for the purpose of illustration is shown a preferred embodiment of the invention, the numeral 10 designates an open topped hopper or seed box, including vertical ends 11, a rear vertical side 12 and a forward inclined side 13. The inclined side 13 slopes downwardly and rearwardly toward the rear vertical side 12, so that a flat bottom 14 of the hopper is substantially narrower than the open top thereof. The hopper 10 is supported horizontally with the flat bottom 14 spaced above the ground, by means of end wheels 15, mounted upon a horizontal transverse shaft or axle 16 which is journaled upon the opposite ends 11 and extends throughout the entire length of the hopper between the ends 11. As shown in Figure 4, the shaft 16 is spaced above the bottom 14 and substantially midway between the forward and rear sides 13 and 12. Circumferentially spaced radial agitator blades or fins 17 are rigidly secured to the shaft or axle 16, inwardly of the ends 11, and these blades 17 preferably extend for substantially the entire length of the shaft 16 between the ends 11. When the shaft 16 rotates with the wheels 15, the outer or free edges of the radial blades 17 pass close to the bottom 14 and sides 12 and 13, as shown.

The rear vertical side 12 is provided near and above the bottom 14, and substantially at the elevation of the horizontal shaft 16 with a horizontal transverse group or row of seed discharge openings 18, which are equidistantly spaced laterally and disposed at the same elevation. The seed discharge openings 18 are preferably spaced apart a slight distance only, such as one inch, although this distance may be varied, as desired.

A rearwardly extending upwardly inclined handle 19 is provided, and this handle is disposed at the transverse center of the hopper 10 and extends above and rearwardly of the hopper for a substantial distance, Figure 1. An attaching yoke including arms 20 is rigidly secured to the bottom end of the handle 19, and short longitudinal sides or extensions 21 are integrally secured to the outer ends of the arms 20, and disposed adjacent to the outer faces of the ends 11 and rigidly secured to such ends by means of bolts 22 or the like. As shown in Figure 1, the extensions 21 are secured to the ends 11 near the top of the hopper. The handle 19 and its yoke arms 20 are thus rigidly secured to the hopper 10, so that when the rear end of the handle 19 is raised and lowered, the entire hopper 10 is tilted or pivoted about the axle or shaft 16.

A longitudinal bar or brace 23 is rigidly secured to the top edges of the sides 12 and 13 at the transverse center of the hopper 10, and this brace 23 extends longitudinally across the top of the hopper and is in longitudinal alignment with the handle 19. At its rear end, the brace 23 includes an upstanding apertured lug 24 with which the forward end of a vertically swingable bell crank lever 25 is pivotally connected, by means of a pin or bolt 26. The bell crank lever 25 extends longitudinally rearwardly of the hopper 10 and includes a depending extension or arm 27 which extends between the arms 20 and below the handle 19, Figure 1. An inclined straight reciprocatory operating rod 28 is disposed beneath the handle 19, and has its bottom end pivotally connected with the lower end of the arm 27, as at 29. Near its upper end, the operating rod 28 is slidable longitudinally within a depending loop or sleeve 30, which is rigidly secured to the bottom side of the handle 19 near the top of the handle.

Slidably mounted upon the outer face of the rear vertical side 12 is a narrow elongated transverse seed discharge control plate or baffle 31, which extends for substantially the entire width of the rear side 12. The plate or baffle 31 is provided with a pair of spaced inclined or diagonal slots 32, slidably receiving therein bolts 33 or the like which coact with the slots 32 to guide the plate or baffle 31 when it is shifted over the rear side 12, by means which will be presently described. A plurality of transversely spaced offset brackets or guides 34 are rigidly secured to the rear side 12 by means of bolts 35 or the like, and the brackets 34 are spaced rearwardly slightly of the side 12 so that the plate or baffle 31 may slidably engage between the brackets 34 and rear side 12. The offset brackets 34 serve to maintain the plate or baffle 31 in sliding engagement with the rear side 12 at all times. The slots 32 cooperate with the bolts 33 to limit the upward and downward movement of the baffle 31.

Additional means are provided to adjustably limit the upward movement of the plate or baffle 31. Such means comprises a pair of polygonal plates 36, pivotally secured to the rear vertical side 12 by means of bolts 37 or the like. The baffle 31 is provided at its top edge and adjacent to the plates 36 with short horizontal rearwardly projecting flanges or tongues 38, integral with the baffle 31, and adapted to engage beneath the plates 36. The arrangement is such that the polygonal plates 36 may be turned or pivoted to the desired adjusted positions, and locked securely in place by means of the bolts 37. In this manner, any of the various sides or corners of the plates 36 may be arranged to contact the tongues 38 of the baffle 31, so that the upward movement of the baffle 31 will be limited or stopped at the desired point.

A substantially vertical bar of strap 39 is disposed near and rearwardly of the rear side 12, and has its top end pivotally connected as at 40 with the bell crank lever 25, rearwardly of the pivot 26. The bottom end of this strap 39 is suitably rigidly secured to the plate or baffle 31 at the transverse center of the hopper 10, as shown.

A rearwardly inclined bent plate 41 constituting a bracket is rigidly secured to the bottom of the hopper bottom 14, Figure 4, and this bracket 41 extends for the entire width of the hopper 10 and rearwardly of the rear side 12, as shown. A substantially flat inclined gage plate 42 is adjustably mounted upon the inclined bracket 41, and is provided with a plurality of transversely spaced vertically extending slots 43 and 43', receiving therethrough bolts 44 or the like. Near its bottom, the gage plate 42 is bent to provide a depending substantially vertical portion or strip 45, integral therewith, and rigidly secured to the bottom of the strip 45 is a narrow flat substantially horizontal strip or ground engaging foot 46. The foot 46 may be adjusted vertically by loosening the bolts 44 and sliding the gage plate 42 upwardly or downwardly upon the bracket 41, the slots 43 and 43' of the gage plate permitting this adjustment. As shown clearly in Figures 1 and 4, the ground engaging strip or foot 46 is arranged a substantial distance below and rearwardly of the hopper bottom 14, and adapted to engage the ground when the handle 19 is lowered.

Mounted upon the gage plate 42 is a corrugated seeder or drill plate 47, having its top end bevelled vertically, as at 48 for engagement against the outer face of the vertical side 12. The upper portion of the drill plate 47 is corrugated, throughout the entire width of the drill plate for forming a plurality of inclined longitudinal V-shaped troughs or grooves 49, which are disposed directly beneath the seed discharge openings 18. Corresponding peaks or ridges 50 are formed upon the drill plate 47 and arranged between the openings 18, so that when grass seed or fertilizer is discharged through the openings 18 it will gravitate directly into the inclined V-shaped troughs 49 of the drill plate. The V-shaped troughs 49 and ridges 50 of the corrugated drill plate terminate a substantial distance above the bottom of the drill plate, and the bottom portion of the drill plate is formed to provide a plurality of integral inclined longitudinal cylindrical tubular extensions or drills 51. The arrangement is such that the bottom ends of the V-shaped troughs 49 lead directly into the open tops of the tubular extensions or drills 51, and the bottom ends of the drills 51 are open, so that the seed or fertilizer may pass downwardly through the drills. We wish to emphasize at this point that the extensions or drills 51 may also be formed U-shaped, or V-shaped in transverse cross section instead of tubular. In fact, the extensions or drills 51 may obviously be given substantially any desired shape in transverse cross section, such as rectangular or diamond shaped. The bottom or trailing ends of the drills 51 are disposed rearwardly of the ground engaging foot 46, Figure 4, and when the gage plate 42 is properly adjusted, the bottom ends of the drills 51 should project slightly below the foot 46 so that they may engage in the soil for forming furrows or grooves, as the device is pushed forwardly over the ground. The drill plate 47 is provided with a plurality of transversely spaced openings for receiving the bolts 44, which also serve for rigidly securing the drill plate 47 to the gage plate 42 and bracket 41. The bevelled end 48 of the drill plate 47 is maintained in engagement with the vertical side 12 at all times, the gage plate 42 being adjusted, by means of the slots 43 and 43', to vary the elevation of the foot 46.

The drill plate 47 is preferably provided at its opposite ends with integral flat extensions or ears 52, which lie flat against the gage plate 42, adjacent to the opposite end slots 43' thereof. A horizontal transverse angle bar or brace 53 is preferably rigidly secured to the top of the drill plate 47, near the longitudinal centers of the V-shaped troughs 49, and this brace 53 increases the rigidity of the drill plate and gage plate 42. Also, the brace 53 extends across the tops of all of the V-shaped troughs 49, and constitutes a levelling or scraping bar beneath which the seed or fertilizer must pass after being discharged through the openings 18 and into the troughs 49. If an excessive amount of seed or fertilizer is introduced into the tops of the troughs 49, such excessive amount will pile up or accumulate behind the member 53, so that the amount of seed or fertilizer passing through each trough 49 will be automatically levelled off flush with the tops of the ridges 50. In this manner, it is possible for the V-shaped troughs 49 to be filled with seed or fertilizer, but the brace or leveller 53 prevents the troughs 49 from running over.

In operation, the bolts 44 may be loosened, and the gage plate 42 adjusted for positioning the ground engaging foot 46 at the desired elevation. The higher the foot 46 is elevated, the deeper will be the furrows or grooves formed in the soil by the drills 51. Likewise, the farther downwardly the foot 46 is adjusted, the shallower will be the furrows formed by the drills 51. The hopper 10 is filled or partly filled with grass seed, finely divided fertilizer, or the like, and the device is propelled over the lawn by pushing upon the handle 19. The blades 17 rotate with the shaft 16, and continuously agitate the contents of the hopper, so that no large lumps or clods can form.

The rate of discharge of the seed or fertilizer through the openings 18 is controlled by the manipulation of the rod 28, and associated elements. When the rod 28 is pulled rearwardly longitudinally, the bell crank lever 25 swings upwardly about its pivot 26, for elevating the strap 39 and plate or baffle 31. The baffle 31 will shift upwardly between the brackets 34 and rear side 12, until the top of the baffle engages the plates 36, which limit its upward movement. The downward movement of the baffle 31 is limited by the tops of the slots 32, and these slots also serve to guide the reciprocation of the baffle 31, as previously stated. When the rod 28 is pushed longitudinally forwardly, the bell crank lever swings downwardly, lowering the baffle 31, and covering the discharge openings 18. In this manner, the extent of uncovering of the openings 18 may be controlled by the operator. If desired, the operating rod 28 may be reciprocated, so that the plate or baffle 31 will shift up and down, alternately covering and uncovering the discharge openings 18. Also, the baffle 31 may be shifted to a desired position, wherein it either partially or wholly uncovers the discharge openings 18 and held in such position by the operator.

As the device is propelled over the ground, the handle 19 is depressed sufficiently to maintain the foot 46 in contact with the ground. This causes the drills 51 to cut shallow furrows or grooves in the soil, while the seed or fertilizer is continuously fed through the discharge openings 18 by the agitator blades, and downwardly through the V-shaped troughs 49 and tubular drills 51. In this manner, the furrows or grooves formed by the drills 51 will have continuous streams of seed or fertilizer deposited within them, as the device is pushed forwardly.

After the drills 51 have formed the furrows and deposited the seed or fertilizer within them, if the soil is soft and granular, the furrows will tend to fill themselves in or close, after the passing of the drills 51. However, to insure the proper filling of the furrows, as well as the complete covering of the seeds or fertilizer, it may be desirable to roll the ground transversely of the furrows formed by the drills 51, after the planting operation is completed. However, it should be noted that it is not necessary to rake the seed or fertilizer into the lawn after it is planted. The drills 51 in effect perform the raking operation, during the distribution of the seed or fertilizer. Since the raking in operation is eliminated, a substantial saving in labor and time is effected. Thus in the seeding or fertilizing of a lawn, it should never be necessary to do more than use our device, as above described, and then roll the lawn.

The construction of the device is highly simplified, compact and extremely sturdy. The various parts are all well adapted for large scale or mass production methods, and the entire device should be relatively inexpensive to build.

It is to be understood that the form of the invention, herewith shown and described is to be taken as a preferred example of the same, and that various changes in shape, size and arrangement of parts may be resorted to, without departing from the spirit of the invention or the scope of the subjoined claims.

Having thus described our invention, we claim:

1. A lawn seed planter comprising a wheeled hopper adapted for forward movement along a longitudinal path of travel, said hopper being of considerable transverse extent perpendicular to said path of travel and having a generally horizontal bottom and a generally vertical rear side, the rear side being provided with a discharge opening extending for substantially the entire transverse extent of the hopper, means operatively connected with the hopper for feeding seed through the discharge opening, handle means secured to the hopper and extending longitudinally rearwardly therefrom for propelling and tilting the hopper, a generally flat inclined gage plate secured to the hopper bottom and arranged below the discharge opening and extending for substantially the entire transverse extent of the hopper, the gage plate extending below and rearwardly of the rear side of the hopper and including a part adapted to contact the ground when the handle means is tilted downwardly, and a drill plate having corrugations disposed parallel to said path of travel mounted upon the gage plate and arranged below the discharge opening, said drill plate extending for substantially the entire transverse extent of the hopper and substantially covering the gage plate, the corrugations of the drill plate being of small transverse extent and disposed parallel to the path of travel of the hopper to form closely spaced narrow troughs receiving seed from the discharge opening, the lower portion of each trough being separated from other like portions and formed into a seed conveying extension to provide a series of transversely spaced extensions receiving seed from said troughs and projecting below and rearwardly of the part of the gage plate adapted to contact the ground, the lower ends of said extensions adapted to form closely spaced furrows in the ground and deposit seed therein when the handle means is tilted downwardly and the hopper is propelled forwardly.

2. A lawn seed planter comprising a wheeled hopper adapted for forward movement along a longitudinal path of travel, said hopper being of considerable transverse extent perpendicular to said path of travel and having a generally horizontal bottom and a generally vertical rear side, the rear side being provided with a discharge opening extending for substantially the entire transverse extent of the hopper, means operatively connected with the hopper for feeding seed through the discharge opening, handle means secured to the hopper and extending longitudinally rearwardly therefrom for propelling and tilting the hopper, a generally flat inclined bracket secured to the hopper bottom, a generally flat gage plate superimposed upon and adjustably secured to the bracket and arranged below the discharge opening and extending for substantially the entire transverse extent of the hopper, the gage plate extending below and rearwardly of the rear side of the hopper and including a part adapted to contact the ground when the handle means is tilted downwardly, and a drill plate having corrugations disposed parallel to said path of travel mounted upon the gage plate and arranged below the discharge opening, said drill plate extending for substantially the entire transverse extent of the hopper and substantially covering the gage plate, the corrugations of the drill plate being of small transverse extent and disposed parallel to the path of travel of the hopper to form closely spaced narrow troughs receiving seed from the discharge opening, the lower portion of each trough being separated from other like portions and formed into a seed conveying extension to provide a series of transversely spaced extensions receiving seed from said troughs and projecting below and rearwardly of the part of the gage plate adapted to contact the ground, the lower ends of said extensions adapted to form closely spaced furrows in the ground and deposit seed therein when the handle means is tilted downwardly and the hopper is propelled forwardly.

HYMIE G. NEWMAN.
DAVE B. NEWMAN.

REFERENCES CITED

The following references are of record in the file of this patent:

UNITED STATES PATENTS

| Number | Name | Date |
|---|---|---|
| 356,438 | Ball | Jan. 25, 1887 |
| 880,908 | Niebel | Mar. 3, 1908 |
| 909,478 | Thorp | Jan. 12, 1909 |
| 977,884 | King | Dec. 6, 1910 |
| 1,254,859 | Siemann | Jan. 29, 1918 |
| 1,473,297 | Knight | Nov. 6, 1923 |
| 2,318,064 | Delaney | May 4, 1943 |
| 2,522,693 | Stiteler | Sept. 19, 1950 |

FOREIGN PATENTS

| Number | Country | Date |
|---|---|---|
| 1,898 | Great Britain | 1912 |
| 5,405 | Great Britain | 1915 |
| 290,994 | Germany | Mar. 29, 1916 |